United States Patent [19]

Vanderkooi, Jr. et al.

[11] 4,327,007

[45] Apr. 27, 1982

[54] POLYETHYLENE TEREPHTHALATE COMPOSITION CONTAINING ALIPHATIC PLASTICIZER AND NUCLEATING AGENT

[75] Inventors: Nicholas Vanderkooi, Jr., Pompton Plains; Harold W. Tuller, Long Valley, both of N.J.

[73] Assignee: Allied Chemical Corporation, Morris Township, Morris County, N.J.

[21] Appl. No.: 219,088

[22] Filed: Dec. 22, 1980

[51] Int. Cl.$^3$ .......................... C08K 5/11; C08L 67/00
[52] U.S. Cl. ................................... 524/315; 524/394; 523/455
[58] Field of Search ................... 260/31.8 XA, 31.8 R

[56] References Cited

U.S. PATENT DOCUMENTS 3,516,957  6/1970  Gray, Jr. et al. .................. 260/22

FOREIGN PATENT DOCUMENTS 7901609  8/1979  Netherlands ............... 260/31.8 XA

*Primary Examiner*—William F. Hamrock
*Assistant Examiner*—Peter F. Kulkosky
*Attorney, Agent, or Firm*—Richard A. Negin

[57] ABSTRACT

A polyester composition comprising: the sodium salt of a hydrocarbon acid; and the ester of an aliphatic carboxylic acid having at least one carboxyl group and from 2 to 8 carbon atoms; and an alcohol having one hydroxyl group and from 1 to 10 carbon atoms. The sodium salt is preferably sodium stearate and the ester is preferably di(2-ethyl-hexyl)adipate. The composition can be filled and have impact modifiers.

24 Claims, No Drawings

POLYETHYLENE TEREPHTHALATE COMPOSITION CONTAINING ALIPHATIC PLASTICIZER AND NUCLEATING AGENT

BACKGROUND OF THE INVENTION

1. Field of Invention

This invention relates to a polyethylene terephthalate composition containing the sodium salt of a hydrocarbon acid and an aliphatic plasticizer.

2. Description of the Prior Art

It is known to use nucleating agents in crystallizable polymers such as linear saturated polyesters of aromatic dicarboxylic acids. U.S. Pat. Nos. 3,435,093, 3,516,957 and 3,639,527, as well as Dutch Pat. Nos. NL7901009 and NL7901605, disclose various approaches to molding thermoplastic compositions of linear saturated polyesters of aromatic dicarboxylic acids, and are particularly applicable to polyethylene terephthalate. These patents generally disclose the use of salts of hydrocarbon and polymeric carboxylic acids as nucleating agents for linear saturated polyesters. Other patents of interest relating to crystalline polyester compositions include: U.S. Pat. Nos. 3,516,957 and 3,435,093.

A molding formulation based on a linear saturated polyester, such as polyethylene terephthalate, should result in molded product having good physical properties including flexural strength, modulus, tensile strength and impact properties. Further, the molding compound should also have good molding properties including a melt flow index for sufficient flow into the mold, good mold release properties and good finished appearance.

From a practical point of view, it is desirable that satisfactory properties, as outlined above, be attained using water heated molds. That is, molds heated to temperatures between 76° C. to 100° C. In order to accomplish this, it is desirable for crystallization to begin at as high a temperature as possible upon the cooling of the polyester which was fed into the mold and continue during the cooling to as low a temperature as possible. $T_{cc}$ is a measurement to determine at what temperature crystals first appear upon cooling from the melt. $T_{ch}$ is a measurement which indicates the temperature at which crystallization is no longer occurring upon cooling. It has been found that mold appearance and mold release properties can be related to $T_{ch}$. $T_{ch}$ is determined by measuring the temperature at which crystals first appear upon heating an amorphous piece of polyester. $T_{cc}$ and $T_{ch}$ can be measured using a Differential Scanning Calorimeter.

SUMMARY OF THE INVENTION

This invention is a composition of matter comprising polyethylene terephthalate, up to about 10%, and preferably 0.2 to 2%, based on the weight of the polyethylene terephthalate of a sodium salt of a hydrocarbon acid having from about 9 to about 25 carbon atoms and at least one carboxyl group, and up to about 15%, preferably about 0.1 to about 10%, and more preferably about 1% to about 6%, based on the weight of the polyethylene, of a plasticizer. The plasticizer is the ester of an aliphatic carboxylic acid having at least one carboxyl group, and from 2 to 8 carbon atoms and an alcohol having one hydroxyl group and from 1 to 10 carbon atoms. Preferably, the composition contains up to about 10%, based on the weight of the polyethylene terephthalate, of an impact modifier. The composition can contain up to about 150%, based on the weight of the polyethylene terephthalate, of a filler.

A preferred embodiment comprises the polyethylene terephthalate, from about 0.2% to about 2% of of the sodium salt of a hydrocarbon acid, such as sodium stearate, and from about 1% to about 6% by weight of the polyethylene terephthalate of an aliphatic plasticizer, such as di(2-ethyl-hexyl)adipate. Preferably, there is from about 30% to 90% based on the weight of the polyethylene terephthalate of filler, such as glass fibers, and from about 2% to 6% of an impact modifier, such as ethylene acrylic acid copolymer. Percents are based on the weight of polyethylene terephthalate.

The present invention is a polyethylene terephthalate composition which can be molded in water heated molds. It contains both a nucleating agent and the noted plasticizer to widen the temperature spread between the $T_{cc}$ and $T_{ch}$. That is, the $T_{cc}$ is increased and the $T_{ch}$ is decreased, thereby allowing crystallization to occur over as wide a range as possible.

Objects, features and advantages of the present invention will become apparent by reference to the following specification:

DESCRIPTION OF THE PREFERRED EMBODIMENTS

This invention is a composition comprising a blend of a linear saturated polyester, preferably polyethylene terephthalate, up to about 10%, and preferably 0.2 to 2%, based on the weight of the polyethylene terephthalate, of a sodium salt of a hydrocarbon acid having from about 9 to about 25 carbon atoms and at least one carboxyl group, up to about 15%, preferably about 0.1 to 10%, and more preferably from about 1% to about 6%, based on the weight of the polyethylene terephthalate, of a plasticizer. The plasticizer is an ester of an aliphatic carboxylic acid having at least one carboxyl group, and from 2 to 8 carbon atoms, and an alcohol having from 1 to 10, and preferably from 4 to 8 carbon atoms. There can be up to about 150%, and preferably between about 30% and 90% filler, based on the weight of the polyethylene terephthalate. The preferred filler is fiberglass in the range of from 30% to 90% by weight based on the polyethylene terephthalate. Preferably, the composition can contain up to about 10%, and preferably 2% to 6%, based on the weight of the polyethylene terephthalate, of an impact modifier.

The polyethylene terephthalate for use with the present invention has an intrinsic viscosity range between about 0.4 and about 1.00, with a preferred intrinsic viscosity range between about 0.45 and 0.75. Intrinsic viscosity is obtained by extrapolation of viscosity values to zero concentration of solutions of polyethylene terephthalate in a 60 to 40 volume ratio of phenol and tetrachloroethane. The measurements are normalized to 25° C. The polyethylene terephthalate can contain minor amounts, up to 5%, of other comonomers, such as diethylene glycol or glutaric acid.

The sodium salt of the hydrocarbon acid is considered as the nucleating agent of the composition of the present invention. There should be sufficient nucleating agent to allow the formation of crystals in the molten composition at a high enough temperature upon cooling from the melt, to be molded in water-heated molds, at mold temperatures of from about 76° C. to about 100° C. This allows crystal formation in polyethylene terephthalate before reaching these mold temperatures at which little crystallization is expected.

The temperature at which crystal formation is first measureable is $T_{cc}$. The $T_{cc}$ is measured using a Differential Scanning Calorimeter. Between 5 and 10 milligrams of sample is prepared. The sample is made in the form of a compression molded film which is vacuum dried. The sample is placed in the Differential Scanning Calorimeter and heated to 280° C. where it is held for two minutes. The sample is then cooled at 10° C. per minute. The $T_{cc}$ appears as a sharp peak on the cooling branch of the curve.

The $T_{cc}$ for pure polyethylene terephthalate is approximately 190° C. to 195° C. for polyethylene terephthalate having an intrinsic viscosity normalized to about 0.56. It is desirable for crystallization from the melt to begin at as high a temperature as possible without adversely affecting other properties. This allows crystal nucleation to begin earlier and for nucleation to take place over a greater temperature range. It results in a molding composition which has a high enough $T_{cc}$ so that it can be molded using water heated molds at temperatures as low as 76° C. The $T_{cc}$ is preferably at least about 210° C. and has been increased to more than 215° C. by the use of a nucleating agent, such as sodium stearate.

The hydrocarbon acid has from about 9 to about 25 carbon atoms, and at least one carboxyl group. Representative acids are pelargonic, lauric, myristic, palmitic, stearic, oleic, maleic, linolenic, and behenic. The preferred acids are fatty acids having from 16 to 18 carbon atoms, and the most preferred is stearic acid. The hydrocarbon acid can be formed into a sodium salt by neutralization by methods known in the art, with the preferred salt being sodium stearate. There is up to 10%, preferably from about 0.2 to about 2%, and most preferably from about 0.2 to about 1%, based on the weight of the polyethylene terephthalate, of the sodium salt of the hydrocarbon acid.

There is up to about 15%, preferably from 0.1% to 10%, more preferably from about 1% to about 6%, and most preferably about 2% to 4%, based on the weight of the polyethylene terephthalate, of a plasticizer. The plasticizer useful in the composition of the present invention is an ester of an aliphatic carboxylic acid having at least one carboxyl group and from 2 to 8 carbon atoms, and an alcohol having one hydroxyl group, and from 1 to 10 carbon atoms. Representative aliphatic carboxylic acids include: acetic, propionic, caproic, caprylic, oxalic, malonic, succinic, gluteric acid, adipic, pimelic, suberic, maleic and fumaric. Representative alcohols include, but are not limited to: methyl, ethyl, n-propyl, isopropyl, n-butyl, sec-butyl, tert-butyl, n-pentyl, iso-pentyl, n-hexyl, n-heptyl, n-octyl, n-decyl, ethyl-hexyl. A preferred ester is di(2-ethyl-hexyl)adipate, commonly referred to as dioctyl adipate.

It has been found that the use of a plasticizer and the type of plasticizer affect the mold release properties and molded appearance of the molded polyethylene terephthalate article. $T_{ch}$ is the temperature at which crystals are first measured upon heating an amorphous piece of polyester. The $T_{ch}$ for a pure polyethylene terephthalate is approximately 125° C. It is desirable to lower this value as much as possible for the best mode release, and molded article release properties. The preferred polyethylene terephthalate composition should have as high a $T_{cc}$ as possible and as low as $T_{ch}$ as possible, allowing crystal formation and growth over the widest possible temperature range. The $T_{ch}$ is preferably not greater than about 110° C., and more preferably not greater than about 106° C. It has been decreased to about 106° C. by using a plasticizer such as dioctyl adipate. Therefore, the temperature range over which crystallization can occur is from about 215° C. to about 106° C. during cooling of the composition of the present invention. The range for pure polyethylene terephthalate is about 190° C. to 125° C.

Any suitable filler can be used. The fillers may optionally be treated with various coupling agents or adhesion promotors as is known to those skilled in the art. Such fillers may be selected from a wide variety of minerals, metals, metal oxides, siliceous materials, metal salts, and materials thereof. Examples of fillers include alumina, aluminum hydrates, feldspar, asbestos, talc, calcium carbonates, clay, carbon black, quartz, novaculite and other forms of silica, kaolinite, bentonite, garnet, mica, saponite, beidellite, calcium oxide, calcium hydroxide, etc. The foregoing recited fillers are illustrative only and are not meant to limit the scope of the fillers that can be utilized in this invention. As noted above, the most preferred filler is glass fibers. There is up to 150%, and preferably 30% to 90%, based on the weight of the polyethylene terephthalate of filler, preferably fiberglass.

Preferably, copolymers of ethylene and carboxylic acids or their esters can be used as impact modifiers. Included in these impact modifiers are the following copolymers: ethylene acrylic acid, methylene acrylic acid, ethylene ethyl acrylate, ethylene vinyl acetate, and mixtures thereof. There can be up to about 10% based on the weight, and preferably between about 2% and about 6% based on the weight of the polyethylene terephthalate, of the impact modifier.

The composition can contain a polyepoxide. The epoxy resins which can be used are such as an epoxy formed from bisphenol-A and glycidyl ether, or polyepoxides obtained by reacting orthocresol novolac and epichlorohydrin. Preferred polyepoxides are epoxy cresol novolac resins of the type produced by Ciba-Geigy Corporation, and include ENC TM 1235, 1273 and 1299. Preferably, there is up to 3%, and more preferably 0.1% to about 0.5%, based on the weight of the polyethylene terephthalate, of polyepoxide. The polyepoxides act as chain extenders and help to compensate for polyethylene terephthalate chains broken by hydrolysis.

A preferred filled composition comprises polyethylene terephthalate, from about 30% to 60% glass fibers, from about 1% to 6% dioctyl adipate, from about 0.3% to 0.6% sodium stearate and from about 0.1% to about 0.5% polyepoxide. There can be from about 2% to 4% ethylene acrylic acid. The percents are based on the weight of polyethylene terephthalate.

Optionally, nucleating agents known in the art, such as inert nucleating agents, can be used in addition to the nucleating agent discussed above. Talc is an example of a preferred inert nucleating agent.

In addition to the components discussed above, the compositions of the present invention can contain additives commonly employed with polyester resins, such as colorants, mold release agents, antioxidants, ultraviolet light stabilizers, and the like.

Several examples are set forth below to illustrate the nature of the invention and the manner of carrying it out. However, the invention should not be considered as being limited to the details thereof. All amounts are weight percent unless otherwise indicated.

EXAMPLE 1

Example 1 illustrates polyethylene terephthalate extruder melt blended compositions containing by weight percent, 62% polyethylene terephthalate, 30% glass fibers, 3.5% ethylene acrylic acid copolymer, DOW EAA 455), 0.45% sodium stearate and 4.0% dioctyl adipate. DOW EAA 455 is ethylene acrylic acid copolymer having about 8% by weight acrylic acid, and is manufactured by the Dow Chemical Corporation.

The $T_{cc}$ and $T_{ch}$ have been normalized for a polyethylene terephthalate having an intrinsic viscosity (I.V.) of 0.6. Pure polyethylene terephthalate of 0.6 I.V. has a $T_{cc}$ of about 190° C. and a $T_{ch}$ of about 125° C.

TABLE I

| | Ex. 1 |
|---|---|
| Molding Properties | |
| $T_{cc}$ (.6 I.V.)° C. | 210 |
| $T_{ch}$ (.6 I.V.)° C. | 105 |
| Mold Release (76.7° C.) | E |
| Appearance (76.6° C.) | VG |
| Physical Properties | |
| Flexural (ASTM D-790) | |
| Strength × 10³ | 21.8 |
| Mod. × 10⁶ | 1.05 |
| Tensile (ASTM D-638) | |
| Strength × 10³ | 14.3 |
| % Elong | 1.8 |

The blends were molded in a mold heated to only 76.7° C. The molded sample had excellent (E) release, in that it never stuck in the mold and the mold could be operated automatically. The molded sample had very good (VG) appearance, in that it was shiny and smooth with an occasional wet surface. The wetness was apparently plasticizer.

EXAMPLE 2-5

Examples 2 to 5 illustrate polyethylene terephthalate (PET) extruder melt blended compositions containing varying amounts of dioctyl adipate. The compositions and their molding and physical properties are summarized in Table II below. The $T_{cc}$ and $T_{ch}$ have been normalized for a polyethylene terephthalate having an I.V. of 0.6. The samples on which physical properties were measured were molded at 210° F.

TABLE II

| | Ex. 2 | Ex. 3 | Ex. 4 | Ex. 5 |
|---|---|---|---|---|
| PET | 62.57 | 63.57 | 64.57 | 65.57 |
| Glass Fibers | 30.00 | 30.00 | 30.00 | 30.00 |
| EAA (DOW EAA 455) | 2.75 | 2.75 | 2.75 | 2.75 |
| Sodium Stearate | .38 | .38 | .38 | .38 |
| Epoxy | .30 | .30 | .30 | .30 |
| Dioctyl Adipate | 4.00 | 3.0 | 2.0 | 1.0 |
| Molding Properties | | | | |
| $T_{cc}$ (.6 I.V.)° C. | 216 | 216 | 217 | 216 |
| $T_{ch}$ (.6 I.V.)° C. | 102 | 104 | 106 | 110 |
| Mold Release (98.9° C.) | E | E | E | VG |
| Appearance (98.9° C.) | VG | VG | G | G(D) |
| Mold Release (76.7° C.) | E | E | VG | VG |
| Physical Properties | | | | |
| Flex Str.(ASTM D-790) × 10³ | 25.0 | 28. | 29.8 | 30.8 |
| Izod Impact (ASTM D-256) (Unnotched) | 10.5 | 12.5 | 13.0 | 14.2 |

The blends were molded in molds heated to 98.9° C. and 76.7° C. As the amount of plasticizer was decreased, the mold release properties went from excellent (E) to very good (VG). Very good mold release is acceptable for manufacturing, but the molded sample occasionally sticks in the mold and has to be manually removed. The mold appearance was very good (VG) at 3 and 4 percent dioctyl adipate levels. The samples were shiny and smooth with an occasional wet spot.

At the 2 percent level, the sample had less wet spots and at the 1 percent level, the samples were dry. The samples at the 1 and 2 percent level, although shiny and smooth, were slightly more dull (D) than at 3 and 4 percent. It is noted that the physical properties decreased with the level of dioctyl adipate. Therefore, a preferred level of dioctyl adipate is about 2 percent by weight of the composition (about 3% based on the weight of the PET).

While exemplary embodiments of the invention have been described, the true scope of the invention is to be determined from the following claims:

What is claimed is:

1. A composition comprising:
   polyethylene terephthalate;
   up to about 15 percent based on the weight of the polyethylene terephthalate of a plasticizer which comprises an ester of an aliphatic carboxylic acid having from 2 to 8 carbon atoms and at least 1 carboxyl group, and an alcohol having from 1 to 10 carbon atoms and 1 hydroxyl group; and
   up to about 10 percent, based on the weight of the polyethylene terephthalate, of a nucleating agent which comprises the sodium salt of a hydrocarbon acid having from 9 to about 25 carbon atoms, and at least 1 carboxyl group.

2. The composition as recited in claim 1 wherein there is from about 0.1% to about 10%, based on the weight of the polyethylene terephthalate, of the plasticizer.

3. The composition as recited in claim 2 wherein there is from about 1% to about 6%, based on the weight of the polyethylene terephthalate, of the plasticizer.

4. The composition as recited in claims 1 or 3 wherein the nucleating agent is the sodium salt of a hydrocarbon acid having from 16 to 18 carbon atoms.

5. The composition as recited in claim 4 wherein the plasticizer is di(2-ethyl-hexyl)adipate.

6. The composition as recited in claim 4 wherein there is from about 0.2% to 2%, based on the weight of the polyethylene terephthalate, of nucleating agent.

7. The composition as recited in claim 4 wherein the nucleating agent is sodium stearate.

8. The composition as recited in claim 7 where there is from about 0.2% to about 1% of the sodium stearate.

9. The composition as recited in claim 8 wherein the plasticizer in di(2-ethyl-hexyl)adipate.

10. The composition as recited in claim 1 further comprising up to 150%, based on the weight of the polyethylene terephthalate, of a filler.

11. The composition as recited in claim 10 wherein there is between about 30% and about 90%, based on the weight of the polyethylene terephthalate, of glass fiber filler.

12. The composition as recited in claim 1, 4 further comprising up to 10%, based on the weight of the polyethylene terephthalate, of an impact modifier.

13. The composition as recited in claim 12 wherein the impact modifier is selected from a group consisting of the following copolymers: ethylene acrylic acid, methylene acrylic acid, ethylene ethyl acrylate, and ethylene vinyl acetate.

14. The composition as recited in claim 13 containing between about 2% and about 6%, based on the weight of the polyethylene terephthalate, of the impact modifier.

15. The composition as recited in claim 4, further comprising up to 3% of the polyethylene terephthalate of an epoxy.

16. The composition as recited in claim 1 containing sufficient nucleating agent for the composition to have a $T_{cc}$ of at least about 210° C.

17. The composition as recited in claim 1 containing sufficient plasticizer for the composition to have a $T_{ch}$ of not greater than 110° C.

18. A composition comprising:
polyethylene terephthalate;
from about 1% to about 6%, based on the weight of the polyethylene terephthalate, of di(2-ethyl-hexyl)adipate; and
from about 0.2% to about 2%, based on the weight of the polyethylene terephthalate, of sodium stearate.

19. The composition as recited in claim 18 further comprising up to 150%, based on the weight of the polyethylene terephthalate, of a filler.

20. The composition as recited in claim 19 wherein there is from about 30% to about 90%, based on the weight of the polyethylene terephthalate, of a filler.

21. The composition as recited in claim 20 wherein the filler is glass fibers.

22. The composition as recited in claims 18 or 19 further comprising about 2% to about 6%, by weight of the polyethylene terephthalate, of an impact modifier.

23. The composition as recited in claim 20 wherein the impact modifier is ethylene acrylic acid copolymer.

24. The composition as recited in claim 18 further comprising up to 3% of the polyethylene terephthalate of an epoxy.

* * * * *

UNITED STATES PATENT AND TRADEMARK OFFICE
CERTIFICATE OF CORRECTION

PATENT NO. : 4,327,007
DATED : April 27, 1982
INVENTOR(S) : N. Vanderkooi, Jr. and H. Tuller It is certified that error appears in the above—identified patent and that said Letters Patent is hereby corrected as shown below:

Column 3, Line 67 -- as low as $T_{ch}$ -- should be -- as low a $T_{ch}$ --;

Column 4, Line 43 -- ENCtm -- should be ECNtm --;

Column 5, Line 23 -- (76.6° C.) -- should be -- (76.7° C.) --;

Column 8, Lines 2 and 3 -- di(2-ethyl-hexyl-)adipate; -- should be -- di(2-ethyl-hexyl)-adipate; --;

Signed and Sealed this

Fifth Day of October 1982

[SEAL]

Attest:

GERALD J. MOSSINGHOFF

*Attesting Officer*     *Commissioner of Patents and Trademarks*